May 31, 1955  N. S. WELLS  2,709,774
MOTOR CONTROL SYSTEMS
Filed Nov. 13, 1952

WITNESSES:
E. A. McCloskey
E. F. Oberheim

INVENTOR
Norman S. Wells.
BY
Paul E. Friedemann
ATTORNEY

United States Patent Office 2,709,774
Patented May 31, 1955

2,709,774

MOTOR CONTROL SYSTEMS

Norman Simpson Wells, Hamilton, Ontario, Canada, assignor to The English Electric Company Limited, London, England, a British company Application November 13, 1952, Serial No. 320,173

Claims priority, application Great Britain November 23, 1951

9 Claims. (Cl. 318—144)

This invention relates generally to motor control systems, and more in particular to such systems wherein provision is made for controlling an electrical condition of a motor.

In the application of motors in driving high inertia loads or overhauling loads, it is usually desirable to limit motor current so that optimum accelerating and decelerating rates may be obtained without electrically overloading the motor, or causing operation of overload protective devices excepting in emergencies. In such applications, for one direction of rotation of the motor, current limit control for both motoring and regenerative or braking currents is desirable, to adequately protect the system.

While in its broader aspects this invention is applicable in controlling either D. C. or A. C. motors and may be utilized otherwise than in controlling motor current, the invention is conveniently illustrated in a specific embodiment directed to current limit control in a variable voltage D. C. drive, in which the armature winding of a D. C. generator is connected to the armature winding of a D. C. motor, the respective field windings of the machines being separately excited. The generator voltage, under the control of its field winding, controls the output of the motor by controlling the motor armature terminal voltage. In such a drive, when the generator voltage is changed, the motor tends to accelerate in the sense the voltage changes. If, due to the nature of the load, the rate of change of acceleration is too low, excessive motor currents may result. This invention provides a control of either motoring or regenerative current, by suitable control of the mentioned generator field winding, in dependence of the overload current and the polarity of such current for a given direction of motor rotation.

In general, it is one object of this invention to provide a control for controlling an electrical condition of a motor which is simple in its elements with respect to operational requirements and positive in operation.

More specifically stated, it is an object of this invention to provide a simple and effective current limit control for a motor.

Further to the preceding object, it is an object of this invention to provide such a control which limits both motoring and regenerative or braking currents.

In a more specific sense, it is an object of this invention to provide a current limit control system for a motor which is responsive to both motoring and braking currents and which is effective to decrease the voltage applied to the motor in response to motoring current and to increase the voltage applied to the motor in response to braking or regenerative currents.

An ancillary object of this invention is to provide a control system in which certain electrical characteristics of the respective components entering into the combination are compensated.

These and other objects and advantages will become apparent from a study of the following disclosure when considered in conjunction with the accompanying drawing, in which.

Figure 1:
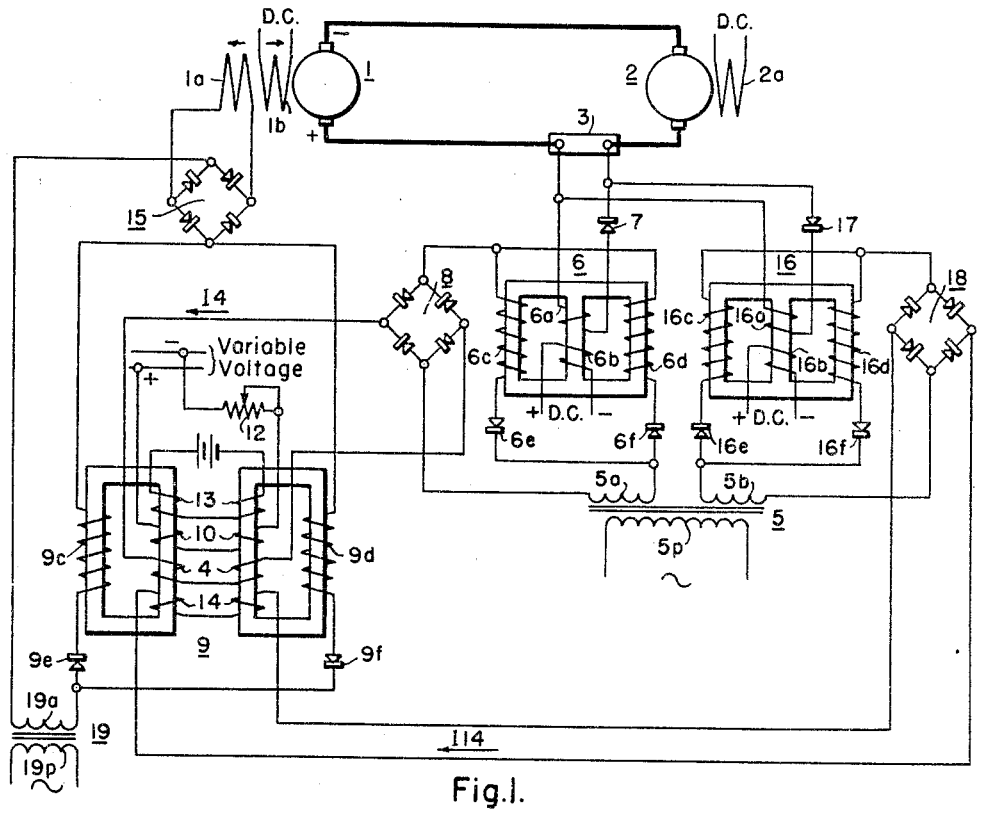
Figure 1 is a diagrammatic illustration of a motor control system embodying the principles of this invention.

In the drawing, the motor system to be controlled embodies a direct current generator, generally designated 1, and a direct current motor to be controlled, generally designated 2. The generator is provided with a pair of separately excited, differentially related field windings $1a$ and $1b$ respectively. The motor is provided with a separately excited field winding $2a$ which in this application is connected to a source of direct current. With the connection herein provided for the motor field winding, motor output is controlled by variation of the motor armature terminal voltage. This motor generator system will be recognized as a conventional variable voltage drive.

In utilizing a current cue from the motor armature circuit for controlling the field winding $1a$ of the generator, a pair of magnetic amplifiers which may be generally identified as electrical transducers are utilized. These magnetic amplifiers are conventional and are identifiable as the parallel connected doubler type. Each magnetic amplifier is provided with a pair of differentially related control windings, magnetic amplifier 6 having a saturation control winding $6a$ and a bias winding $6b$ and magnetic amplifier 16 having a saturation control winding $16a$ and a bias winding $16b$. The respective saturation control windings $6a$ and $16a$ are connected in series with respective rectifiers 7 and 17 in parallel circuits across a shunt 3 in the armature circuit of the motor. The rectifiers in these respective control winding circuits are oppositely poled so that the respective control windings are sensitive to armature currents of opposite polarity. The respective bias windings $6b$ and $16b$ are utilized to bias the respective magnetic amplifiers into their minimum output ranges in an amount depending upon the magnitude of armature current which is permissible.

The main winding circuits which include windings $6c$, $6d$ and $16c$, $16d$ of these respective magnetic amplifiers are connected in series with respective rectifiers $6e$, $6f$ and $16e$, $16f$. Main windings $6c$ and $6d$ and their respective series self-saturating rectifiers $6e$ and $6f$ are connected in parallel. Similarly main windings $16c$ and $16d$ and their respective series self-saturating rectifiers $16e$ and $16f$ are connected in parallel. These respective parallel circuits are connected in series with respective secondary windings $5a$ and $5b$ of a transformer 5 having a primary winding $5p$ connected to a suitable supply of alternating current. The outputs of these respective main winding circuits are polarized by respective full wave load rectifiers 8 and 18 which are connected in the respective main winding circuits. The output terminals of rectifier 8 are connected to a control winding 4 of a third magnetic amplifier, generally designated 9, and the output terminals of rectifier 18 are connected to a control winding 14 of magnetic amplifier 9. These windings are differentially related. Hence, the polarized outputs of respective magnetic amplifiers 6 and 16 which are controlled in dependence of motor armature current are opposed in the input circuits of magnetic amplifier 9. The arrangement is such that for quiescent conditions the ampere turns of winding 4 are equal and opposite to the ampere turns of winding 14 so that the net ampere turns under quiescent conditions is zero.

Figure 2:
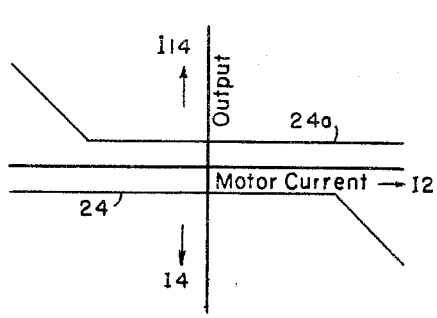
Fig. 2 shows curves illustrating the operating characteristics of one portion of the control system.

The characteristics of this portion of the control are illustrated in Fig. 2 wherein motor armature current $I_2$ is plotted on the abscissa and the respective output currents of magnetic amplifiers 6 and 16 which are designated $I_4$ and $I_{14}$ are plotted negatively and positively along the ordinate of this curve. The bias characteristic of respective windings 6b and 16b of the current limit magnetic amplifiers is represented on the horizontal portion of the respective curves 24 and 24a indicating that these amplifiers are biased into their minimum output range. The extent of this bias depends upon the permissible magnitude of motor armature current. Hence, when the ampere turns of either of windings 6a or 16a, which drive the respective magnetic amplifiers in the direction of saturation, exceeds the bias ampere turns, a sharp increase in output of the associated amplifier follows, resulting in an unbalance in the ampere turns of windings 4 and 14 of magnetic amplifier 9, driving this magnetic amplifier in a direction to limit the motor armature current by suitably controlling the generator field winding 1a.

Magnetic amplifier 9 is similar in principle to the previously described magnetic amplifiers being of the parallel connected doubler type. The parallel connected main winding circuit of this magnetic amplifier, which includes respective main windings 9c and 9d and the respective series connected self-saturating rectifiers 9e and 9f, is energized by the secondary winding 19a of a transformer 19 having a primary winding 19p connected to the same supply of alternating current as winding 5p, previously described, or connected to a separate but similar supply of alternating current, as that applied to the winding 5p. The output of this amplifier is polarized by a full wave rectifier 15 connected in the main winding circuit. The output terminals of rectifier 15 being connected to field winding 1a of the generator. Two additional control windings are provided on magnetic amplifier 9. One is a bias winding 13 and the other is an adjustable control winding 10. Bias winding 13 is adapted for connection to a supply of direct current and by reference to Fig. 3 this winding is utilized to bias magnetic amplifier 9 into the lower range of the linear portion of the characteristic of the amplifier. This is designated by line 22 which intercepts the characteristic adjacent the knee at the bottom of the characteristic curve. In this curve the abscissa represents armature current and the ordinate represents the output or the generator field strength. Control winding 10, which is connected to a supply of direct current and provided with an adjustable rheostat 12 for controlling the ampere turns of this winding, is utilized to bias this amplifier in a positive sense over the range designated 20 and may thereby be utilized to control the excitation of the generator field 1a to control the motor terminal voltage as desired. A winding of this type is frequently referred to as a pattern winding since it determines the operating pattern of the motor.

Figure 3:
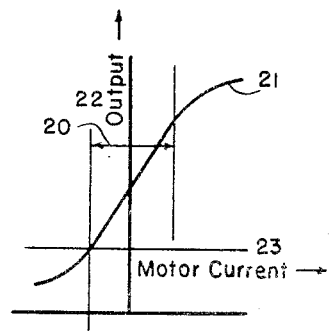
Fig. 3 shows curves illustrating the operating characteristics of another portion of the control system.

As will be seen by reference to Fig. 3, under quiescent condition the ampere turns of the generator field 1a will not be zero since the amplifier 9 is not biased to cut-off. Consequently, a second field winding for the generator such as 1b may be required in order to reduce the generator excitation to zero for quiescent conditions. This winding, due to the fact that it opposes the ampere turns of the winding 1a, effectively shifts the abscissa to the line 23 intersecting the characteristic by line 22 at the point of intersection of the characteristic by line 22. The new system coordinates, therefore, may be identified by the lines 22 and 23.

With the system described, it will be seen, that when that fraction of the motor current is of such polarity and magnitude that the ampere turns of winding 6a exceed the ampere turns of winding 6b the output of amplifier 6 increases sharply. The ampere turns of control winding 4 of magnetic amplifier 9 now exceed the ampere turns of winding 14. The net ampere turns which now exist oppose the ampere turns of pattern winding 10. For this condition of operation the over-load current is due to excessive motor current. This action decreases the degree of saturation of magnetic amplifier 9 and as a consequence, the excitation of winding 1a decreases which decreases the generator voltage and hence the motor voltage to lower the motor current. This regulating action continues in such a way as to maintain the motor current in a narrow range about the critical value. Hence, if the system were accelerating, the motor would be accelerated at optimum speed within limits determined by the motor armature current.

If the motor were connected to a high inertia load and the pattern voltage controlling winding 10 were suddenly removed, the motor would tend to decelerate. However, considerable overhauling may result from this type of operation, in which case excessive regenerative or braking currents may exist. Under this condition of operation the ampere turns of winding 14 exceed those of winding 4 and due to the relationship of these ampere turns with the pattern winding 10 the magnetic amplifier 9 is driven toward saturation. This increases the excitation of the generator field winding 1a which due to the overhauling nature of the load tends to minimize the motor armature current and maintain this current within a limited range about the critical value and so reduces the rate of dynamic braking.

With the system illustrated, reversing of the motor may be obtained by interrupting the connection of field winding 1a to rectifier 15. The ampere turns acting on the generator are now due exclusively to the field winding 1b. Since these ampere turns are reversed with respect to those of the winding 1a, the generator voltage is reversed which reverses the motor armature terminal voltage, driving the motor in the opposite direction. It will be appreciated in this instance that current limit control is not available.

The field winding 1b of the generator may be eliminated by employing a split field winding in place of the field winding 1a and utilizing a pair of magnetic amplifiers such as 9 connected to the respective sections of the split field. In such an arrangement, the control windings 10, 4 and 14 are distributed in two sections, one section being provided on the respective magnetic amplifiers. The magnetic amplifiers would be connected in a manner similar to the transducers or magnetic amplifiers 6 and 16 so that the minimum output of these amplifiers would result in equal and opposite ampere turns in the separate sections of the field winding of the generator and their control outputs producing ampere turns in the split generator field in the same sense.

It will be appreciated from an examination of the system that the various electrical characteristics of the magnetic amplifiers, namely for instance their minimum outputs, are compensated in electrically symmetrical oppositely poled circuit arrangements. For example, the outputs of magnetic amplifiers 6 and 16 are opposed in respective windings 4 and 14 so that only that characteristic due to overload current results in the production of control ampere turns. Similarly the minimum output of amplifier 9 is compensated in the provision of field winding 1b or in the second modification suggested which corresponds to the compensating system utilized in connection with amplifiers 6 and 16.

Compensation of the minimum outputs of amplifiers 6 and 16 may be achieved externally of the input circuits to amplifier 9 by opposing the outputs of rectifiers 8 and 18 in a resistor network, the output of which may be utilized to control a single control winding on amplifier 9. In such an arrangement, as well as in that illustrated, a definite control advantage is obtained in that both of the rectifiers 8 and 18 are continuously excited with a base excitation current which tends to operate these rectifiers at a current level either approaching or in the more linear portion of the forward resistance characteristic of these rectifiers. Hence, the output of this circuit is essentially a linear function of the current in the armature circuit of the motor.

Although this invention has been illustrated using magnetic amplifiers, it will be appreciated that other types of amplifiers, variable impedance or reactance devices or controllable voltage producing devices may be utilized in practicing the general principles of this invention.

The foregoing disclosure and the illustrations made in the drawing are merely illustrative of the principles of this invention and are not to be construed in a limiting sense.

I claim as my invention:

1. A motor control system comprising, a direct current motor, a pair of electrical saturable core devices, each having a polarized control winding circuit, a differential control winding circuit and a polarized output winding circuit; each polarized input winding circuit being connected to said motor to be energized respectively in dependence of currents of opposite polarity, each differential input winding circuit maintaining the associated saturable core device essentially inoperative below given levels of energization of the associated polarized input winding circuit, a third saturable core device having a pair of differentially related input winding circuits connected to said respective polarized output winding circuits and having an output winding circuit, an adjustable control winding circuit producing a magnetic flux in said third saturable core device in a sense aiding the flux of the output winding circuit therefor for controlling the output of said third saturable core device, and circuit means connecting said output winding circuit of said third saturable core device to said motor to energize said motor.

2. A motor control system comprising, a direct current motor, a pair of electrical saturable core devices, each having a polarized control winding circuit, a differential control winding circuit and a polarized output winding circuit; each polarized input winding circuit being connected to said motor to be energized respectively in dependence of currents of opposite polarity, each differential input winding circuit maintaining the associated saturable core device essentially inoperative below given levels of energization of the associated polarized input winding circuit, a third electrical saturable core device having a pair of differentially related input winding circuits connected to the respective polarized output winding circuits and having an output winding circuit, an adjustable control winding circuit producing a magnetic flux in said third saturable core device in a sense aiding the magnetic flux of the output winding circuit therefor for controlling the output of said third saturable core device, and a generator having a field winding connected to said output winding circuit of said third saturable core device and an armature winding connected to the armature winding of said motor.

3. A motor control system comprising, a direct current motor, a pair of electrical saturable core devices, each having a polarized control winding circuit, a differential control winding circuit and a polarized output winding circuit, each polarized input winding circuit being connected to said motor to be energized respectively in dependence of currents of opposite polarity, each differential input winding circuit maintaining the associated saturable core device essentially inoperative below given levels of energization of the associated polarized input winding circuit, a third electrical saturable core device having a pair of differentially related input winding circuits connected to the respective polarized output winding circuits and having an output winding circuit, an adjustable control winding circuit producing a magnetic flux in said third saturable core device in a sense aiding the magnetic flux produced by the output winding circuit therefor for controlling the output of said third saturable core device, a generator having a field winding connected to said output winding circuit of said third saturable core device and an armature winding connected to the armature winding of said motor, and a second field winding on said generator differentially related to the first field winding.

4. A motor control system comprising, a pair of magnetic amplifiers, each having a pair of differentially related control windings, a rectifier connected with one of the control windings of each of the magnetic amplifiers, each rectifier being adapted for connection to the motor, said rectifiers being oppositely poled so that the connected control windings are selectively energized depending upon the polarity of motor current, circuit connections for energizing the other control winding of each magnetic amplifier, said magnetic amplifiers having polarized output circuits, a third magnetic amplifier having a pair of differentially related control windings, an adjustable control winding and a polarized output circuit, said differentially related control windings of said third magnetic amplifier being connected to said respective polarized output circuits of said pair of magnetic amplifiers, and electrical means connected with said polarized output circuit of said third magnetic amplifier for controlling the energization of said motor.

5. A motor control system comprising, a pair of magnetic amplifiers, each having a pair of differentially related control windings, a rectifier connected with one of the control windings of each of the magnetic amplifiers, each rectifier being adapted for connection to the motor, said rectifiers being oppositely poled so that the connected control windings are selectively energized depending upon the polarity of motor current, circuit connections for energizing the other control winding of each magnetic amplifier, said magnetic amplifiers having polarized output circuits, a third magnetic amplifier having a pair of differentially related control windings, an adjustable control winding and a polarized output circuit, said differentially related control windings of said third magnetic amplifier being connected to said respective polarized output circuits of said pair of magnetic amplifiers, and a generator having a field winding connected to said polarized output circuit of said third magnetic amplifier and having an armature winding adapted for connection to the armature winding of said motor.

6. A motor control system comprising, a pair of magnetic amplifiers, each having a pair of differentially related control windings, a rectifier connected with one of the control windings of each of the magnetic amplifiers, each rectifier being adapted for connection to the motor, said rectifiers being oppositely poled so that the connected control windings are selectively energized depending upon the polarity of motor current, circuit connections for energizing the other control winding of each magnetic amplifier, said magnetic amplifiers having polarized output circuits, a third magnetic amplifier having a pair of differentially related control windings, an adjustable control winding and a polarized output circuit, said differentially related control windings of said third magnetic amplifier being connected to said respective polarized output circuits of said pair of magnetic amplifiers, a generator having a field winding connected to said polarized output circuit of said third magnetic amplifier and having an armature winding adapted for connection to the armature winding of said motor, and an adjustable field winding on said generator differentially related to said first named field winding.

7. In a current limit control for a direct current motor for limiting both motoring and regenerative currents, the combination of, a direct current motor having an armature winding and a field winding, a first magnetic amplifier having a control winding, a bias winding, and a polarized output circuit; a second magnetic amplifier having a control winding, a bias winding, and a polarized output circuit, a rectifier connecting the control winding of the first magnetic amplifier to said armature winding to be energized in dependence of motoring current, a rectifier connecting the control winding of the second magnetic amplifier to said armature winding to be energized in dependence of regenerative motor current, each bias winding biasing the associated magnetic amplifier into the minimum output range thereof, a third magnetic amplifier having current limit control winding means, adjustable saturating control winding means, and a polarized output circuit, circuit means connecting said current limit control winding means to said polarized output circuits of said first and second magnetic amplifiers to be energized in dependence of the difference in outputs thereof, and circuit means connected to the polarized output circuit of said third magnetic amplifier and to said motor armature winding to control energization of said motor.

8. In a current limit control for a direct current motor for limiting both motoring and regenerative currents, the combination of, a direct current motor having an armature winding and a field winding, a first magnetic amplifier having a control winding, a bias winding, and a polarized output circuit; a second magnetic amplifier having a control winding, a bias winding, and a polarized output circuit, a rectifier connecting the control winding of the first magnetic amplifier to said armature winding to be energized in dependence of motoring current, a rectifier connecting the control winding of the second magnetic amplifier to said armature winding to be energized in dependence of regenerative motor current, each bias winding biasing the associated magnetic amplifier into the minimum output range thereof, a third magnetic amplifier having current limit control winding means, adjustable saturating control winding means, and a polarized output circuit, circuit means connecting said current limit control winding means to said polarized output circuits of said first and second magnetic amplifiers to be energized in dependence of the difference in outputs thereof, and a generator having a field winding connected to the output circuit of said third magnetic amplifier and an armature winding connected to the armature winding of said motor.

9. In a current limit control for a direct current motor for limiting both motoring and regenerative currents, the combination of, a direct current motor having an armature winding and a field winding, a first magnetic amplifier having a control winding, a bias winding, and a polarized output circuit; a second magnetic amplifier having a control winding, a bias winding, and a polarized output circuit, a rectifier connecting the control winding of the first magnetic amplifier to said armature winding to be energized in dependence of motoring current, a rectifier connecting the control winding of the second magnetic amplifier to said armature winding to be energized in dependence of regenerative motor current, each bias winding biasing the associated magnetic amplifier into the minimum output range thereof, a third magnetic amplifier having current limit control winding means, adjustable saturating control winding means, and a polarized output circuit, circuit means connecting said current limit control winding means to said polarized output circuits of said first and second magnetic amplifiers to be energized in dependence of the difference in outputs thereof, a generator having a field winding connected to the output circuit of said third magnetic amplifier and an armature winding connected to the armature winding of said motor, and a second field winding on said generator differentially related to the first field winding and compensating the ampere turns of said first field winding due to minimum output of said third magnetic amplifier.

References Cited in the file of this patent

UNITED STATES PATENTS

| | | |
|---|---|---|
| 2,121,588 | Eames | June 21, 1938 |
| 2,330,638 | Stratton | Sept. 28, 1943 |
| 2,550,122 | Osbon | Apr. 24, 1951 |
| 2,586,284 | Abell | Feb. 19, 1952 |
| 2,632,139 | Bloodworth | Mar. 17, 1953 |